(12) United States Patent
Rising, III

(10) Patent No.: US 6,392,649 B1
(45) Date of Patent: May 21, 2002

(54) METHOD AND APPARATUS FOR UPDATING A MULTIDIMENSIONAL SCALING DATABASE

(75) Inventor: Hawley K. Rising, III, San Jose, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/176,052

(22) Filed: Oct. 20, 1998

(51) Int. Cl.$^7$ ................................................ G06T 11/20
(52) U.S. Cl. ....................................................... 345/440
(58) Field of Search ................................. 345/437, 440, 345/436; 707/5, 2, 3, 6; 382/36

(56) References Cited

U.S. PATENT DOCUMENTS

| | | | | |
|---|---|---|---|---|
| 5,181,259 A | * | 1/1993 | Rorvig | 382/36 |
| 5,596,703 A | * | 1/1997 | Eick et al. | 345/440 |
| 5,835,085 A | * | 11/1998 | Eick et al. | 345/440 |
| 5,913,211 A | * | 6/1999 | Nitta | 707/5 |
| 5,986,673 A | * | 11/1999 | Martz | 345/437 |
| 6,012,058 A | * | 1/2000 | Fayyad et al. | 707/6 |

OTHER PUBLICATIONS

Tipping, Michael E., "Topographic Mappings and Feed-Forward Neutral Networks", The University of Aston in Birmingham, pp. 1–157, Feb. 1996.

Lindman and Caelli, "Constant Curvature Riemannian Scaling" Journal of Mathematical Psychology 17, pp. 89–109, 1978.

Rogowitz, Frese, Smith, Bouman, and Kalin, "Perpetual Image Similarity Experiments", Human Vision and Electronic Imaging IV, Proceedings of the SPIE, pp. 1–15, Jan. 26–29, 1998.

Faloutsos and Lin, "FastMap: A Fast Algorithm for Indexing, Data–Mining and Visualization of Traditional and Multimedia Datastets".

Kohonen, Teuvo, *Self–Organizing Maps*, 2nd Ed., Springer–Verlag, pp. 157–201, Jan. 1997.

Borg and Groenen, *Modern Multidimensional Scaling, Theory and Applications*, Springer–Verlag, pp. 135–157, 1997.

H. K. , Rising, "Generalizing a Fuzzy Edge Detection Model With Radon Transforms," Unpublished, (Accepted for IEEE FUZZ '98 withdrawn because of non–attendance) pp. 1–6.

H. K.., Rising, "Deriving And combining Biologically Plausible Visual Processes with The Windowed Radon Transform," Human Vision and Electronic Imaging III, SPIE, Vol. 3299, San Jose, pp. 519–525, Jan. 1998.

* cited by examiner

Primary Examiner—Jeffrey Brier
Assistant Examiner—Chantè Harrison
(74) Attorney, Agent, or Firm—Blakely, Sokoloff, Taylor & Zafman, LLP

(57) ABSTRACT

A method, apparatus and article of manufacture for updating a new node in a multidimensional scaling (MDS) database having an existing node. The new node is compared to the existing node to obtain a disparity value. A distance value is calculated between the new node and the existing node, a sum of differences value is calculated for the disparity value and the distance value, and a sum of squares value is calculated for the disparity value and the distance value. The position of the new node is modified according to the sum of differences value and the sum of squares value.

12 Claims, 3 Drawing Sheets

METHOD AND APPARATUS FOR UPDATING A MULTIDIMENSIONAL SCALING DATABASE

FIELD OF THE INVENTION

This invention relates generally to data computer database visualization and searching, and more particularly, to a method and apparatus for updating a multidimensional scaling database.

BACKGROUND OF THE INVENTION

The representation of similarity between objects is of great interest in human vision, in image processing, and in computer vision. Quite recently, Cutzu and Edelman reported on results which inferred that humans perhaps organize objects for recognition based on similarities. Their notion is that a "pattern of proximities" modeled an object in an internal representation space. See Cutzu, F. and S. Edelman, "Representation of object similarity in human vision: psychophysics and a computational model". Vision Research 38(15/16), 1998, pp. 2229–2257. In addition, T. Kohonen has for years worked on a model, the self-organizing feature map, that clusters data while preserving the topological arrangement of the clusters. Kohonen's arguments are based on biologically plausible notions. See Kohonen, T. Self-Organizing Maps, 2nd ed. New York: Springer-Verlag, 1997; Tipping, M. E. "Topographic Mappings and Feed-Forward Neural Networks." Ph.D. Thesis, University of Aston in Birmingham, February 1996.

Representations of object similarity in Cutzu and Edelman were visualized using Multidimensional Scaling (MDS), a technique where the relative locations of a set of nodes in a low dimensional (with respect to the size of the set) space are sought, given information that may be interpreted as distances. This follows the use of MDS for arranging images for visualization (Tomasi et al.) or to determine human perceptions of their relationships (Rogowitz et al.). See Rogowitz, B., T. Frese, J. R. Smith, and C. A. Bouman "Perceptual Image Similarity", Human Vision and Electronic Imaging II, SPIE Proceedings 3299, 1998.

Multidimensional scaling (MDS) is a technique used for representing many types of data in a spatial arrangement that is generated from dissimilarity or similarity data. The dissimilarity data is put into a matrix of values which represent distances between data nodes, and then the configuration of data in space which most closely fits the matrix of values is looked for, by using a minimization procedure. Because all of the data is used in the minimization procedure at one time, the procedure is slow when applied to a large set of data nodes. In most MDS techniques, when a data node is added the entire matrix of values is used to recompute the configuration again. The computation technique, which at minimum involves a least squares solution, is therefore order $O(n^3)$ with respect to the number of data nodes, for a fixed number of iterations. Because MDS produces optimal results, database designers typically wish to use this technique for organizing the data in a database of images, some of which may contain thousands of images. However, a procedure of order $O(n^3)$ is generally unacceptable for even modest sized databases. This has been noted by others who have given methods for doing an acceptable job without using the MDS technique, in order to reduce the computational time. For example, see Faloutsos, C. and K. I. Lin., "FastMap: A Fast Method for Indexing. Datamining and Visualization of Traditional and Multimedia Datasets." SIGMOD, 1995, pp. 163–174; and Tipping, M. E., "Topographic Mappings and Feed-Forward Neural Networks", Ph.D. Thesis, University of Aston in Birmingham, February 1996.

Because of the considerations described above, there is a need for a way to update a new node in a MDS database which can be performed in a computationally efficient manner, preferably in order $O(n)$ time or better.

SUMMARY OF THE INVENTION

The present invention provides a method, apparatus and article of manufacture for updating a new node in a multidimensional scaling (MDS) database having an existing node. The new node is compared to the existing node to obtain a disparity value. A distance value is calculated between the new node and the existing node, a sum of differences value is calculated for the disparity value and the distance value, and a sum of squares value is calculated for the disparity value and the distance value. The position of the new node is modified according to the sum of differences value and the sum of squares value.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. An embodiment of the present invention, described below, enables a remote computer system user to execute a software application on a network file server.

The present invention provides a way for updating a new node in a multidimensional scaling (MDS) database having an existing node. The present invention provides a significant improvement in speed by performing the update in order $O(n)$ time for a fixed number of iterations. The new node is compared to the existing node to obtain a disparity value. A distance value is calculated between the new node and the existing node, a sum of differences value is calculated for the disparity value and the distance value, and a sum of squares value is calculated for the disparity value and the distance value. The position of the new node is modified according to the sum of differences value and the sum of squares value.

Hardware Environment

Figure 1:
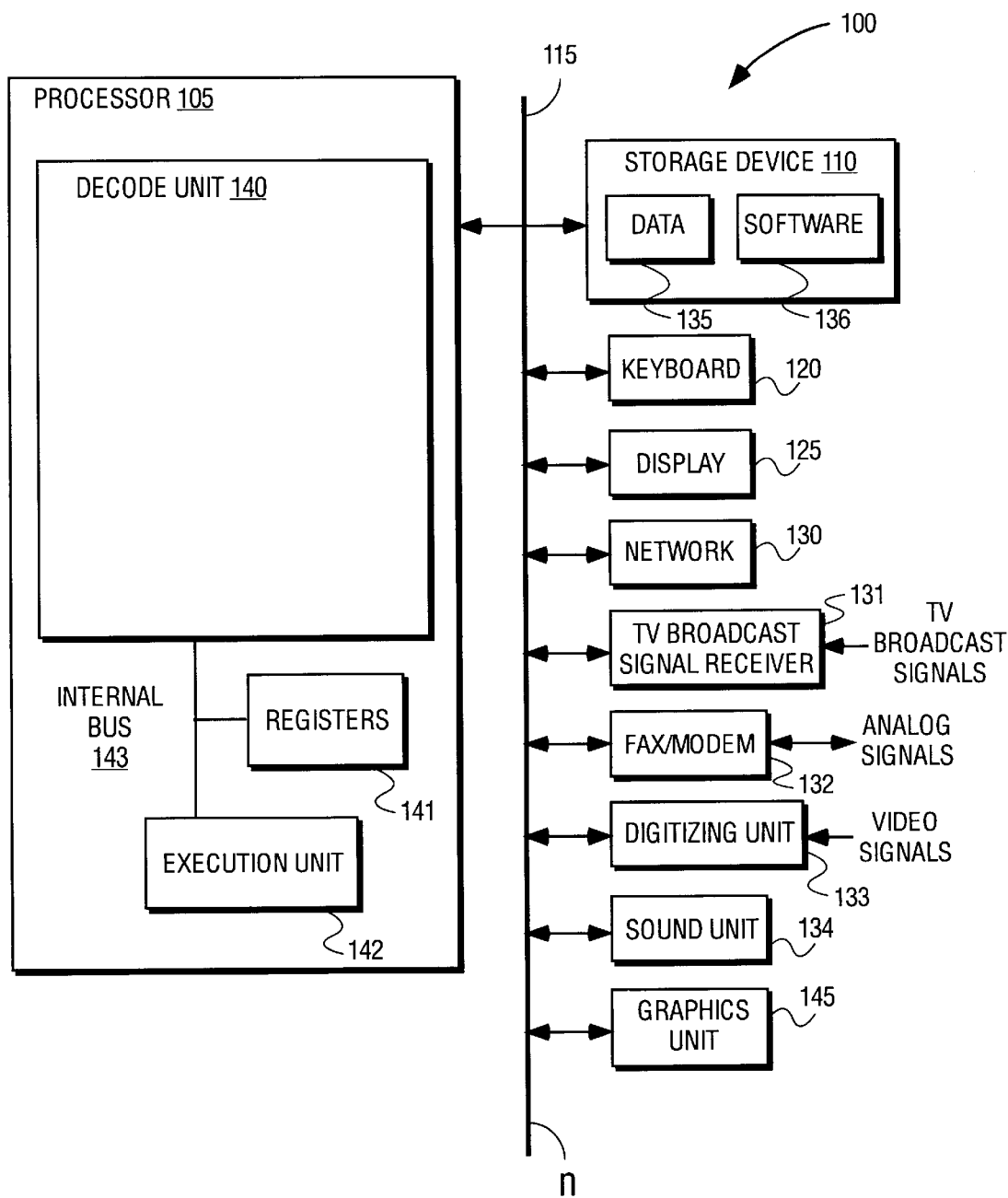
FIG. 1 is a system diagram which shows a computer hardware environment compatible with the present invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 45 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIGS. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry nodes. In response to these control signals and/or microcode entry nodes, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The registers 141 represent a storage are on processor 105 for storing information, including control/status information, integer data, floating node data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

Software Environment

The present invention uses an improvement on a method for solving the minimization problem called majorization, a technique which has been described by Borg, I., and P. Groenen, *Modern Multidimensional Scaling: Theory and Applications*, New York, Springer-Verlag, 1997. This is a method for updating an entire data set by performing a Guttman transform. If X is the configuration of data nodes on the kth iteration, then the (k+1)th iteration is given by $$X^{k+1} = V^+ B(X^k) X^k$$

where $V^+$ is a matrix created by taking the Moore-Penrose inverse of the matrix of weights, and $B(X^k)$ is a matrix which consists of $$b_{ij} = \begin{cases} -w_{ij} \frac{\delta_{ij}}{d_{ij}} & \text{if } d_{ij} \neq 0 \\ 0 & \text{otherwise} \end{cases}$$

if $i \neq j$, and $$b_{ii} = \sum_{j \neq i} -b_{ij}$$

along the diagonal. If the weights $w_{ij}$ are all set equal to one, the matrix becomes a centering matrix and contributes to the numerical value of the updated configuration nodes by introducing a term $1/n$, where n is the number of nodes in the configuration. This method usually is implemented by taking an initial starting configuration, which may be found by Torgerson or classical scaling (see Borg), or may be a random configuration, calculating the matrix $V^+$ and performing the necessary multiplication, then iteratively updating $B(X)$ and X until the change in X is small, or the stress cost function is sufficiently small. With database applications, this can typically be achieved with a fixed number of iterations if the number chosen is suitably large.

Single Node Update Procedure

The present invention is generated from the majorization method by analyzing the update that occurs to a single data node:

$$x_i^{k+1} = \frac{1}{n} \left( x_i^k \sum_{j \neq i} b_{ij} - \sum_{j \neq i} b_{ij} x_j^k \right)$$

which can be written as $$x_i^{k+1} = \frac{1}{n} \left( \sum_{j \neq i} b_{ij} (x_i^k - x_j^k) \right).$$

It will be noted by one of ordinary skill in the art that the quantity $u_{ij}^k \equiv (x_i^k - x_j^k)$ is the vector from $x_j^k$ to $x_i^k$, and that the length of this vector is precisely $d_{ij}$. Based on this quantity, the update formula for a single node may be given as $$x_j^{k+1} = \frac{1}{n} \sum_{j \neq i} \frac{\delta_{ij}}{d_{ij}} u_{ij} = \frac{1}{n} \sum_{j \neq i} \delta_{ij} \hat{u}_{ij}^k$$

where $$\hat{u}_{ij}^k = \frac{u_{ij}^k}{\|u_{ij}^k\|}$$

is a unit vector in the direction from $x_j^k$ to $x_i^k$.

This formula has physical meaning and directly represents a physical construct. If the configuration is considered as a set of weights on springs, then the present invention can be used to update a single node using Hooke's law. The method of the present invention consists of adding together the vector contributions to the stress at a given configuration node, and in accordance with Hooke's law, moving the node at a speed proportional to the resultant sum. The constant of proportionality must be chosen in this case to not overshoot the desired minimum node. The above constant of 1/n will automatically work, since there is a known proof of convergence for the majorization method.

In order to insure that the update method of the present invention will succeed, it must be assumed that the nods $$\{x_j\}_{j \neq i}$$

are arranged in a final configuration. Although this assumption is typically not valid for the first few nodes in a database, given that there are usually many more nodes in the database than dimensions to the database an image may almost always be added using the present invention. The present invention performs the following steps at the new node:

1) Compute the configuration for a large enough portion of the database to fix the locations of the nodes. This can be performed by any of the known methods for performing MDS on a collection of data.
2) For each of the fixed nodes, obtain the dissimilarity values $\delta_{ij}$ with the new node.
3) Calculate the distances to the latest value for $x_i$, and save these in an array.
4) Calculate and sum the values $\delta_{ij}/d_{ij}(x_i-x_j)$, and replace $x_i$ with the new sum.
5) Calculate the stress $$\sum_j (\delta_{ij} - d_{ij})^2.$$

6) Decide, based on either the values of stress, the number of iterations, or the change in either stress or $x_i$ to end or continue by returning to step 3.

The values of the initial configuration in step 1) may be saved in the database, unless there is reason to use different values for different nodes. As previously described above, the present invention assumes that the number of nodes chosen for comparison to the new entry is large enough to fit the dimension of the representation of the image space of the database. Because this is dependent on the dimension, and not on the number of images in the database, the present invention performs an update in constant time for large databases. This enables an effective way to implement MDS for the task of querying and adding images to a large database.

Figure 2:
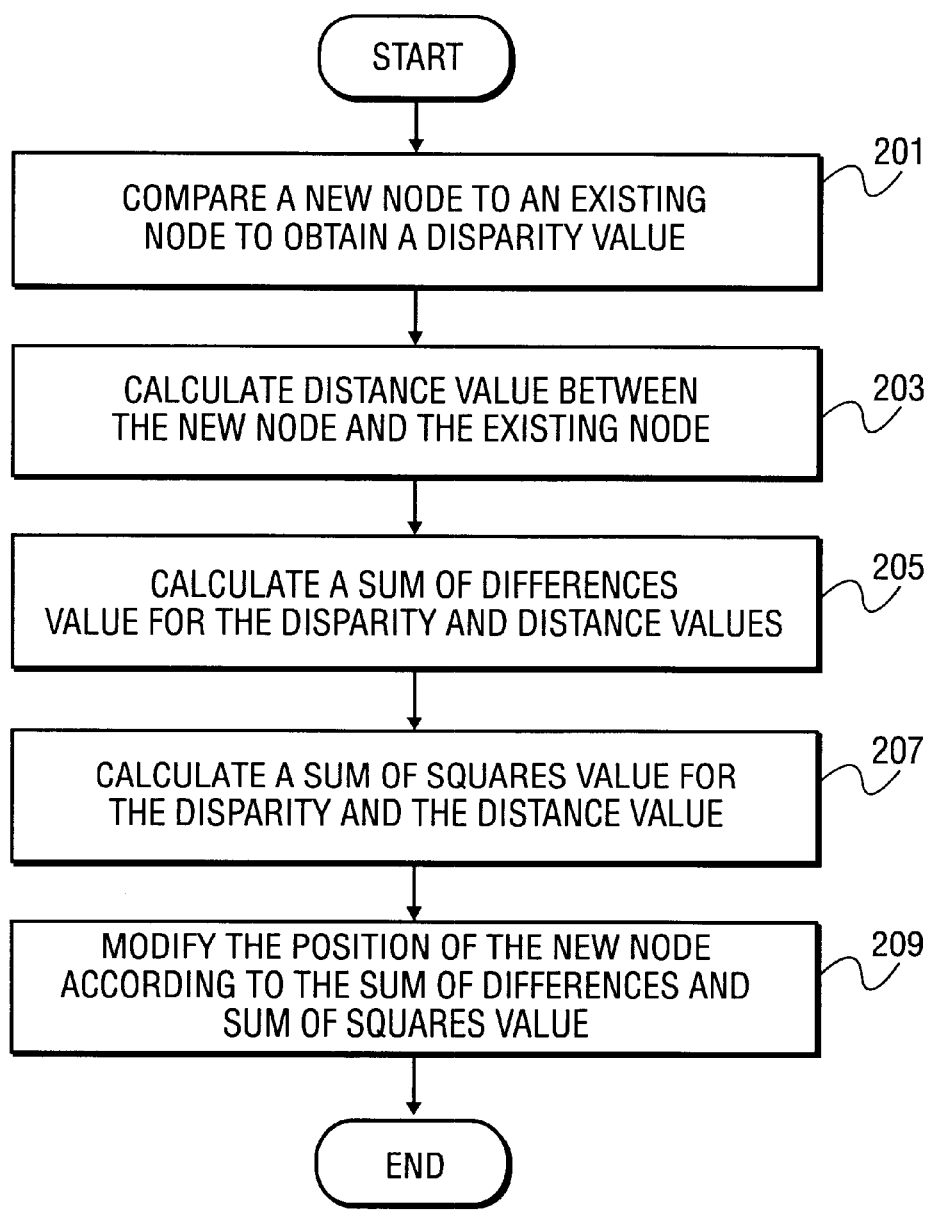
FIG. 2 shows a flow chart of a method for updating a multidimensional scaling database compatible with the present invention.

A flow chart of a method for updating a multidimensional scaling database compatible with the present invention is shown in FIG. 2. At step 201, a new node is compared to the existing node to obtain a disparity value. At step 203, a distance value is calculated between the new node and the existing node. At step 205, a sum of differences value is calculated for the disparity value and the distance value. At step 207, a sum of squares value is calculated for the disparity value and the distance value. At step 209, the position of the new node is modified according to the sum of differences value and the sum of squares value.

Figure 3:
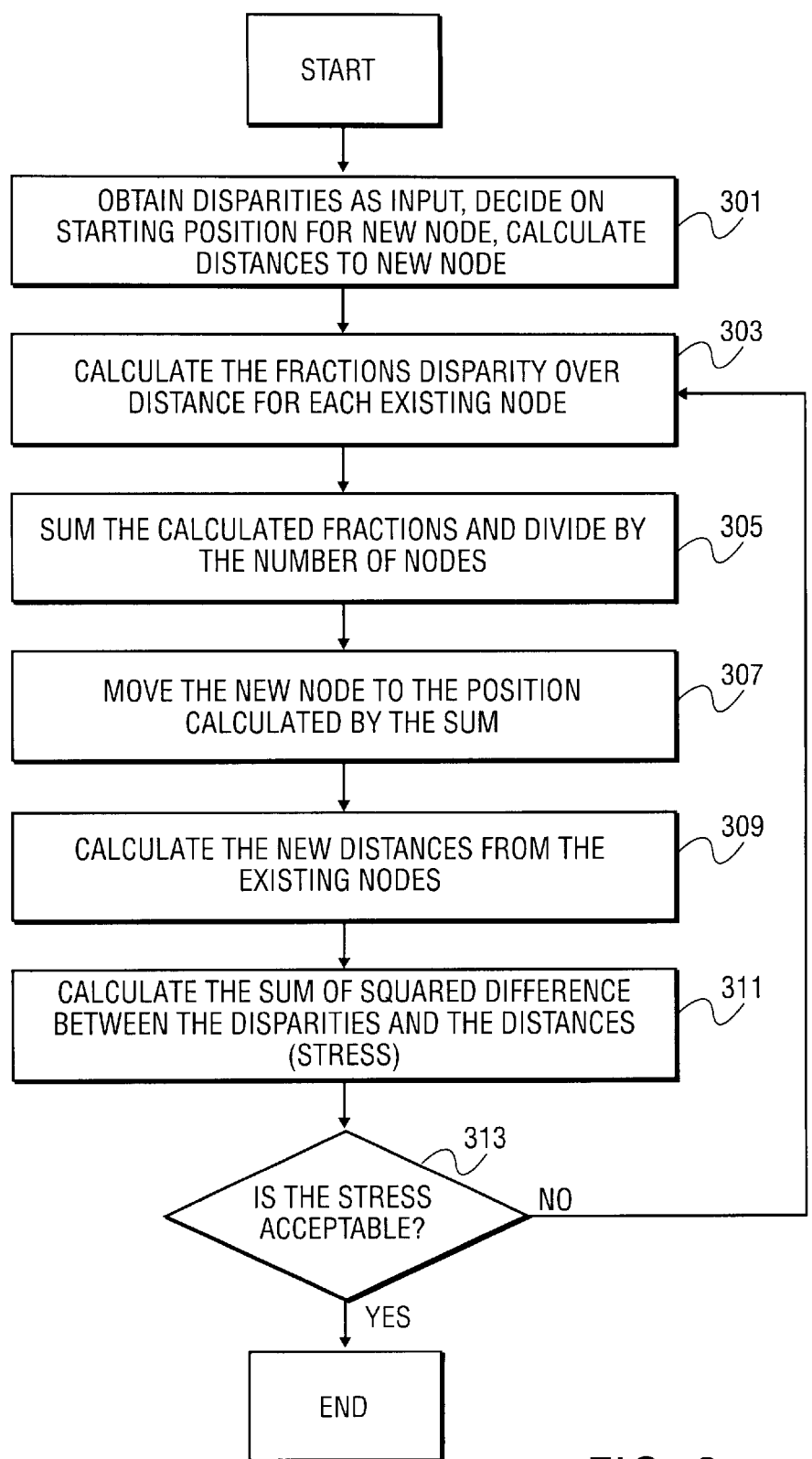
FIG. 3 shows a flow chart of an iterative method for updating a multidimensional scaling database compatible with the present invention.

A flow chart of an iterative method for updating a multidimensional scaling database compatible with the present invention is shown in FIG. 3. At step 301, input disparities are obtained, a starting position for the new node is determined, and the distances from the existing nodes to the new node are calculated. At step 303, a fractions disparity over distance is calculated for each node. At step 305, the calculated fractions are summed and the sum is divided by the number of nodes in the database. At step 307, the new node is moved to the position indicated by the sum. At step 309, the distances from the existing nodes to the new node are recalculated. At step 311, the stress or sum of squares value is calculated between the disparities and the distances. If at step 313 the stress is not acceptable or not within an acceptance threshold, control returns to step 313.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for adding a new node to a multidimensional scaling (MDS) database, the method comprising:
   comparing the new node to each existing node in the MDS database to obtain a disparity value;
   calculating a distance value between the new node and said each existing node;
   calculating a sum of differences value for the disparity value and the distance value;
   calculating a sum of squares value for the disparity value and the distance value; and
   modifying an initial position of the new node in the MDS database while keeping the position of each existing node in the MDS database unchanged, the modification being based upon the sum of differences value and the sum of squares value.

2. The method of claim 1 further comprising determining the initial position for the new node.

3. The method of claim 2 wherein determining the initial position for the new node comprises determining a mean value of the database.

4. The method of claim 1 wherein calculating a sum of difference values comprises calculating the disparity value divided by the distance value multiplied by a direction vector between the new node and the existing node.

5. An apparatus for adding a new node to a multidimensional scaling (MDS) database, the apparatus comprising:
   a comparitor to compare the new node to each existing node in the MDS database to obtain a disparity value;
   a first calculator to calculate a distance value between the new node and said each existing node;
   a second calculator to calculate a sum of differences value for the disparity value and the distance value;
   a third calculator to calculate a sum of squares value for the disparity value and the distance value; and a modifier to modify an initial position of the new node in the MDS database while keeping the position of each existing node in the MDS database unchanged, the modification being based upon the sum of differences value and the sum of squares value.

6. The apparatus of claim 5 further comprising a position determinor to determine the initial position for the new node.

7. The apparatus of claim 6 wherein the position determinor comprises a mean determiner to determine a mean value of the database.

8. The apparatus of claim 5 wherein the second calculator comprises a calculator to calculate the disparity value divided by the distance value multiplied by a direction vector between the new node and the said each existing node.

9. A computer readable medium that provides instructions, which when executed on a processor, cause said processor to perform operations comprising:

comparing a new node to each existing node in a multi-dimensional scaling (MDS) database to obtain a disparity value;

calculating a distance value between the new node and said each existing node;

calculating a sum of differences value for the disparity value and the distance value;

calculating a sum of squares value for the disparity value and the distance value; and modifying an initial position of the new node in the MDS database while keeping the position of each existing node in the MDS database unchanged, the modification being based upon the sum of differences value and the sum of squares value.

10. The computer readable medium of claim 9 wherein the operations further comprise determining the initial position for the new node.

11. The article of manufacture of claim 10 wherein determining the initial position for the new node comprises determining a mean value of the database.

12. The article of manufacture of claim 9 wherein modifying the initial position of the new node according to the sum of differences value comprises calculating the disparity value divided by the distance value multiplied by a direction vector between the new node and the existing node.

* * * * *